US010206531B2

(12) United States Patent
Chan

(10) Patent No.: US 10,206,531 B2
(45) Date of Patent: Feb. 19, 2019

(54) BOWL ASSEMBLY WITH MASHER

(71) Applicant: Munchkin, Inc., Van Nuys, CA (US)

(72) Inventor: Sung Yun Chan, Pasadena, CA (US)

(73) Assignee: Munchkin, Inc., Van Nuys, CA (US)

(*) Notice: Subject to any disclaimer, the term of this patent is extended or adjusted under 35 U.S.C. 154(b) by 62 days.

(21) Appl. No.: 15/417,218

(22) Filed: Jan. 27, 2017

(65) Prior Publication Data
US 2017/0238737 A1    Aug. 24, 2017

Related U.S. Application Data

(60) Provisional application No. 62/287,376, filed on Jan. 26, 2016.

(51) Int. Cl.
*A47J 19/04* (2006.01)
(52) U.S. Cl.
CPC ..................................... *A47J 19/04* (2013.01)
(58) Field of Classification Search
CPC ........................................................ A47J 19/04

USPC .... 220/212, 375, 574.1, 630, 636, 737, 740; 366/129, 130; 206/541, 542, 26, 45.24
See application file for complete search history.

(56) References Cited

U.S. PATENT DOCUMENTS

| 2003/0155363 A1* | 8/2003 | Mercier | B65D 21/0234 |
| | | | 220/630 |
| 2005/0148071 A1* | 7/2005 | Weiss | A61K 38/1825 |
| | | | 435/368 |
| 2006/0000840 A1* | 1/2006 | Kipperman | A61J 9/00 |
| | | | 220/735 |

* cited by examiner

*Primary Examiner* — James N Smalley
(74) *Attorney, Agent, or Firm* — Robert Z. Evora, Esq.; Christian M. Lek

(57) ABSTRACT

A bowl assembly is described having a bowl and lid and a masher. The lid has an embedded suction cup that is adapted to secure the bottom of the bowl when the lid is placed inverted on a flat surface. The bowl has interior ridges which serve to help mash up food when the masher is pressed down. The masher is ring-shaped and has a wider handle and food contacting surface.

17 Claims, 6 Drawing Sheets

BOWL ASSEMBLY WITH MASHER

CROSS REFERENCE TO RELATED APPLICATIONS

This application claims priority to U.S. Provisional Patent Application Ser. No. 62/287,376, filed Jan. 26, 2016; the content of which is hereby incorporated by reference herein in its entirety into this disclosure.

TECHNICAL FIELD

The subject disclosure relates generally to the field of food handling containers. In particular, the subject disclosure relates to a bowl assembly with masher.

BACKGROUND

Feeding infants and toddlers is a never-ending task for parents and caretakers. Because of the young child's limited teeth or potential digestion issues, often the food is mashed, pureed, or otherwise ground down or blended to make chewing and digestion easier, and prevent a choking hazard. Whether at home or away, a parent may take food and mash or puree it to a state that is palatable for the young child. If at home, then a blender or chopper or other small appliance may be used. However, when traveling outside the home, there is no easy access to these small appliances so that parent often has to try to mash or cut up the food pieces manually using a fork or other available utensil. This is not an effective or efficient way to mash food for young children and the resultant uneven or large food pieces may cause chewing problems for a child with few teeth, or a choking hazard or digestion difficulties because the food was not pre-mashed.

SUMMARY OF THE SUBJECT DISCLOSURE

The present subject disclosure provides a novel bowl assembly which serves to be conveniently carried, used and stored. The bowl assembly has a tight fitting but flexible lid with a built in internal suction cup. The lid can be removed and serve as a stable base with the suction cup securing the bowl. A masher is included within the bowl assembly and is ergonomically designed to be used effectively in a small size. The bowl itself has internal structures to assist in the mashing process. After use, the masher may be placed back into the bowl and the lid is re-sealed and the assembly may be transported easily.

In one exemplary embodiment, the present subject matter is a container assembly. The assembly includes a bowl having an open top and a closed bottom; and a lid adapted to fit onto the open top of the bowl, and having a substantially flat top surface and a bottom surface with an embedded suction cup; wherein the bottom of the bowl is adapted to be reversibly sealed onto the suction cup when the top side of the lid is placed inverted on a surface.

In another exemplary embodiment, the present subject matter is a container assembly. The assembly includes a bowl having an open top and a closed bottom; and a lid adapted to fit onto the open top of the bowl, and having a bottom surface with an embedded suction cup; a masher having a handle and a food compressing surface, the masher being fully houseable inside the bowl when the lid is secured on the top of the bowl; wherein the bottom of the bowl is adapted to be reversibly sealed onto the suction cup.

In yet another exemplary embodiment, the present subject matter is a container assembly. The container assembly includes a bowl having an open top and a closed bottom, with internal ridges on an internal surface; and a lid adapted to fit onto the open top of the bowl, and having a bottom surface with an embedded suction cup; a ring-shaped masher having a handle and a food compressing surface, the masher being fully houseable inside the bowl when the lid is secured on the top of the bowl; wherein the bottom of the bowl is adapted to be reversibly sealed onto the suction cup when the top side of the lid is placed inverted on a surface.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1A:
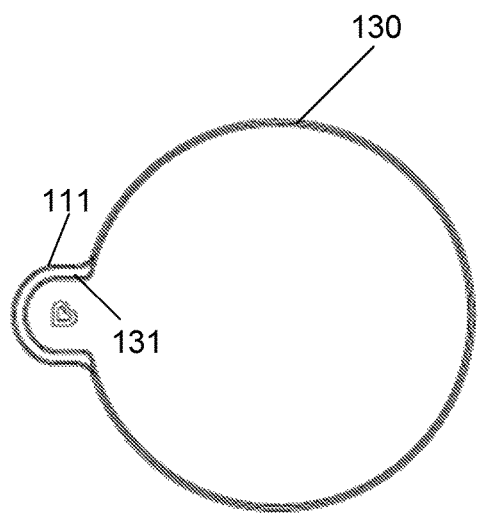
FIG. 1A illustrates a top view of a bowl assembly, according to an exemplary embodiment of the present subject disclosure.
Figure 1B:
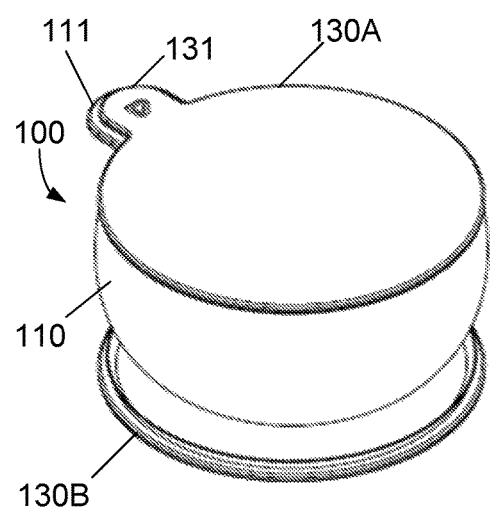
FIG. 1B illustrates a perspective view of a bowl assembly with two optional positions for the lid, according to an exemplary embodiment of the present subject disclosure.
Figure 1C:
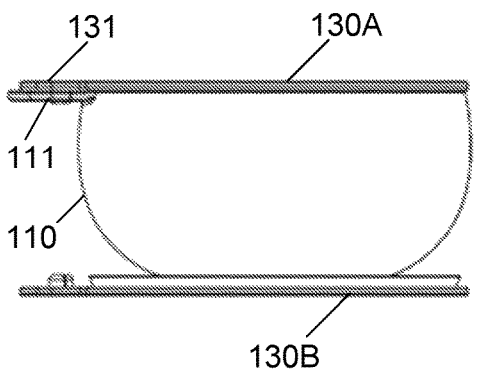
FIG. 1C illustrates a side view of a bowl assembly with two optional positions for the lid, according to an exemplary embodiment of the present subject disclosure.
Figure 1D:
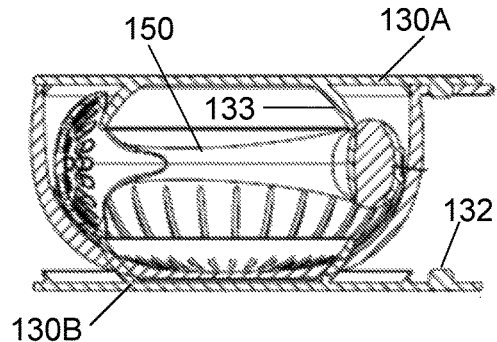
FIG. 1D illustrates a side cross sectional view of a bowl assembly housing a masher and showing two optional positions for the lid, according to an exemplary embodiment of the present subject disclosure.

Particular embodiments of the present subject disclosure will now be described in greater detail with reference to the figures. FIGS. 1A-1D illustrate an exemplary embodiment of the bowl assembly 100 having a bowl 110 and lid 130 which reversibly seals the top of the bowl 110. Lid 130 has a tab 131 which serves to mate with a corresponding tab 111 of the bowl 110. A downward projection 132 on the underside of the tab 131 serves to mate with a corresponding projection receiver 112, such as an aperture, on the top side of the tab 111 (See, for example, FIG. 2C-2D). A masher 150 is completely contained within the bowl 110 when the lid 130 is tightly secured on the top of the bowl 110.

Lid 130 serves at least two different functions. As shown in 1B-1D, lid 130 may be placed at the top of the bowl 110 to secure the contents of the bowl 130, such as the masher 150, food, etc. A built in suction cup 133 positioned on the bottom side of the lid 130 also projects downward on to the masher 150 to decrease movement of the masher 150 during handling. A hermetic seal or other reversible mechanism may be used to fasten the lid 130 to the bowl, as labeled throughout the figures as position 130A. The lid 130 also has a secondary function to maintain the bowl 130 in a stable position 130B during use of the bowl 110 and masher 150, as will be described in more detail below. Thus, lid 130 is adapted to be used in multiple positions 130A and 130B to perform various functions.

Figure 2A:
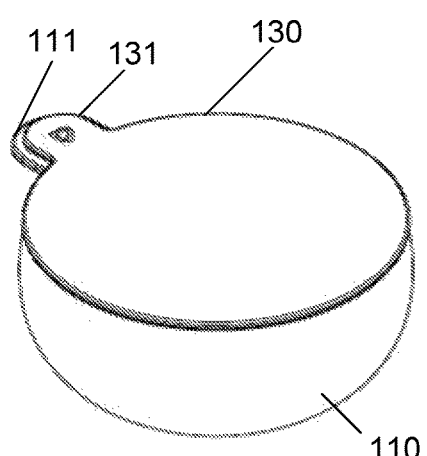
FIG. 2A illustrates a perspective view of a bowl assembly with secured lid atop the bowl, according to an exemplary embodiment of the present subject disclosure.

FIG. 2A illustrates a top perspective view of the bowl assembly 100 with a bowl 110 covered by a lid 130, and having tab 111 of the bowl 110 and tab 131 of the lid overlapping. Corresponding side cross sectional view of FIG. 2C shows that the lid 130 is sealed with respect to the top edge 115 of the bowl 110 through an annular flexible rim 135 on the underside of the lid 130 having an outer diameter which is the same or slightly larger than the inner diameter of the top edge 115 of the bowl 110. This allows the flexible rim 135 to compress slightly when inserted into the top edge 115 of the bowl 110, thereby creating a hermetic seal. A gentle push down on the middle of the top portion of the lid 130 will push out any excess air within the sealed bowl 110 and create a stronger seal between the lid 130 and the bowl 110. Suction cup 133 hangs upside down when the lid 130 is positioned at the 130A position, and may contact masher 150 to provide some support to prevent excessive movement during handling (See FIG. 1D). Further, When the lid 130 is removed, it is inverted so that the top side of the lid 130 shown in FIG. 2A is placed downside on a flat surface, such as a table.

Figure 2B:
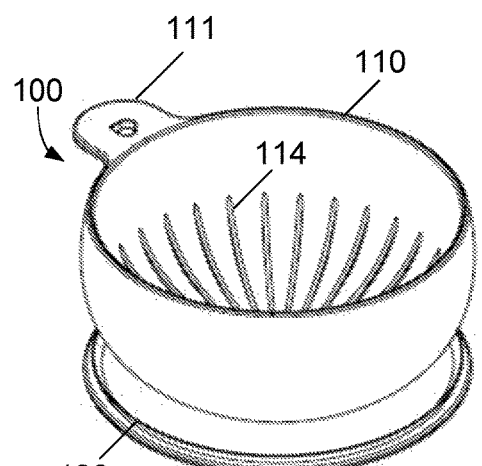
FIG. 2B illustrates a perspective view of a bowl assembly with secured lid underneath the bowl, according to an exemplary embodiment of the present subject disclosure.
Figure 2C:
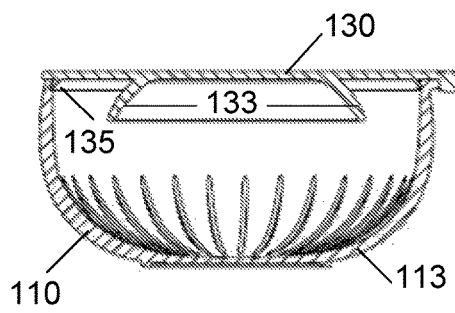
FIG. 2C illustrates a side cross sectional view of a bowl assembly with secured lid atop the bowl, according to an exemplary embodiment of the present subject disclosure.
Figure 2D:
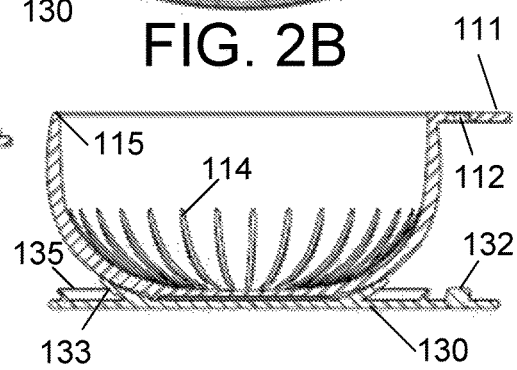
FIG. 2D illustrates a side cross sectional view of a bowl assembly with lid secured underneath the bowl, according to an exemplary embodiment of the present subject disclosure.

FIGS. 2B and 2D show perspective and cross sectional views, respectively, of the bowl assembly 100 when the lid 130 is placed on the underside of the bowl 130. The top side of the lid 130 is placed down on a substantially flat surface, such as a counter top or table, thereby positioning the suction cup 133 in an upward fashion. The bowl 130 is then picked up and placed atop the suction cup 133 such that the underside 113 of the bowl is sized and adapted to be pressed into the suction cup 133, release any air in between, and provide a reversible seal between the bowl bottom 113 and the section cup 133. A gentle push down on the top edge 115 serves to push out any excess air pickets existing between the bowl bottom 113 and the suction cup 133 thereby creating a better seal.

Also seen in FIGS. 2C-2D is the projection 132 in the tab 131 of the lid 130, which is accommodated into receiving aperture 112 of the tab 111 of the bowl 110. Internal ridges 114 are positioned annularly inside the bowl 110 and serve to assist in the mashing of food particles within the bowl 110 by providing an upward uneven force to break up the food particles while the downward force is applied by a masher 150, as will be described in more detail below.

Figure 3A:
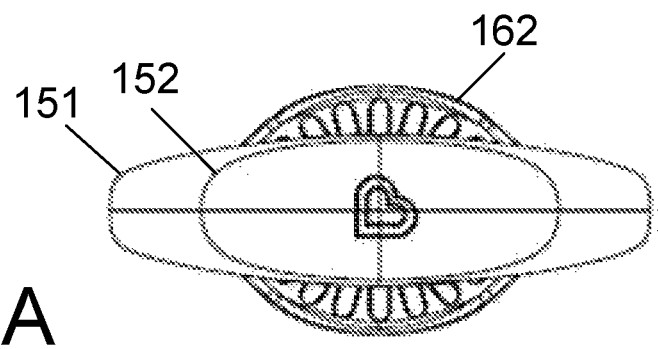
FIG. 3A illustrates a top view of a masher, according to an exemplary embodiment of the present subject disclosure.
Figure 3B:
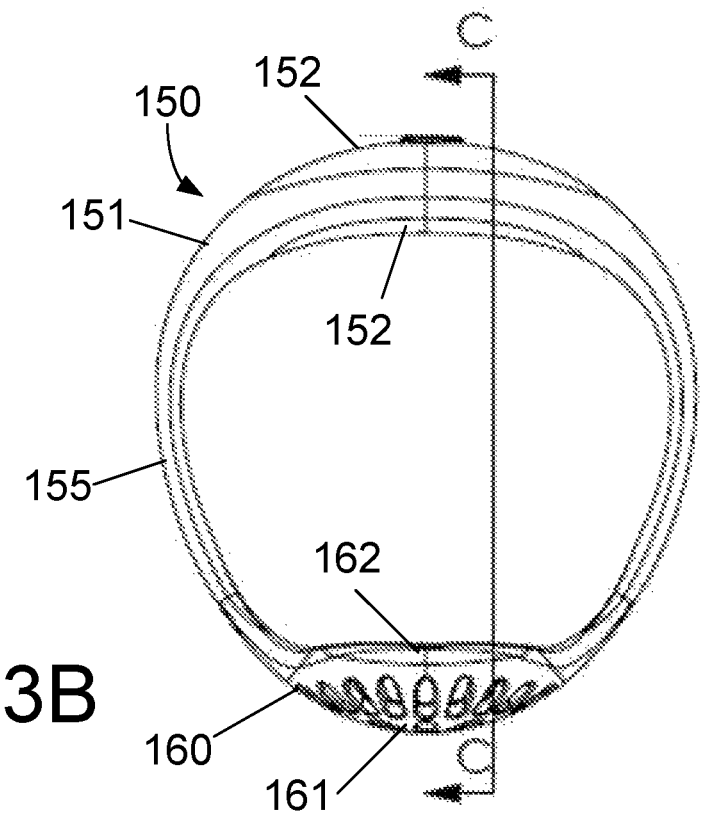
FIG. 3B illustrates a front view of a masher, according to an exemplary embodiment of the present subject disclosure.
Figure 3C:
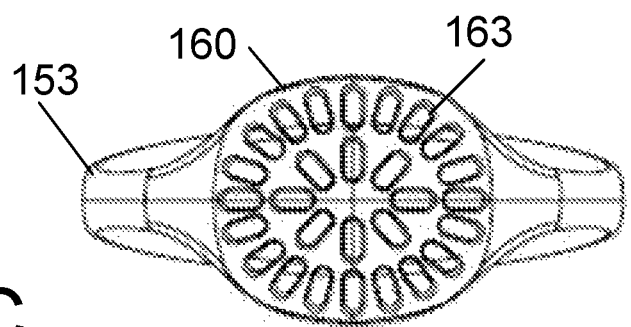
FIG. 3C illustrates a bottom view of a masher, according to an exemplary embodiment of the present subject disclosure.

FIGS. 3A, 3B, and 3C illustrate a top, front, and bottom views of the masher 150, respectively. Masher 150 has a ring-like configuration with two flattened portions, at the handle 151 portion, and the compressing surface portion 160. The handle portion 151 has a wider grip surface to allow for ease in handling the masher 150. In the central portion of the handle 151 is a handle hand contact portion or surface 152 having a softer and/or more flexible material than the rest of the handle 151. The hand contact surface 152 material may be a silicone, or other softer polymer which would be ideal for handling and would not cause harm or strain on the fingers while holding the handle 151. Hand contact surface 152 is shown being placed only on the surfaces of the underlying harder material but can also extend through the entire height of the handle 151. The hand contact surfaces 152 provide contact surfaces where the fingers will be wrapped around the handle 151.

A pair of thinner extended wall portions provides the neck 155 which connects the handle portion 151 with the compressing portion 160. Compressing surface portion 160 comprises a wider surface than the neck portion 155, and has a central arcuate food contact area 161 with apertures 163. The arched or curved shape of the central food contact area 161 allows relatively even contact of the masher food contact area 161 with the bottom internally curved surface of the bowl 110, thereby allowing more effective mashing of food therein. The apertures 163 may be any pattern and serve to more effectively crush food particles by providing uneven surfaces for contact with the food.

As shown in FIGS. 3A and 3B, a flexible, resilient outer edge 162 exists on the two outer edges of the compressing surface portion 160. The flexible outer edges 162 are positioned on the sides of the compressing portion 160 that are between the two necks 155, and not in contact with them. The flexible outer edges 162 allow for an easier scooping of food particles that are within the bowl 110, especially food that is stuck on the interior walls of the bowl 110. The flexible outer edges 162 bend more easily as the masher 150 is used to round up and scoop food that is within the bottom corners of the bowl 110. The flexible outer edges 162 may be comprised of the same material as that of the hand contact surfaces 152, namely silicone or other flexible or soft polymer.

Figure 4A:
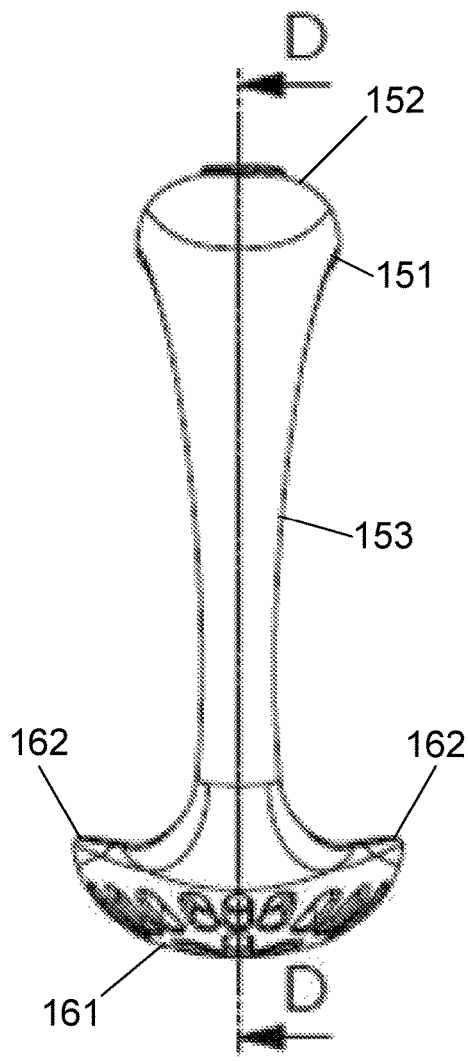
FIG. 4A illustrates a side view of a masher, according to an exemplary embodiment of the present subject disclosure.

FIG. 4A illustrates a side view of the masher 150. As can be seen from the figure, the top (handle 151) and bottom (food contact area 161) have the largest widths, and connected with a relatively narrower neck portion 153. Hand contact surfaces 152 and flexible outer edges 162, which may be composed of the softer material than the rest of the masher 150, are also shown.

Figure 5A:
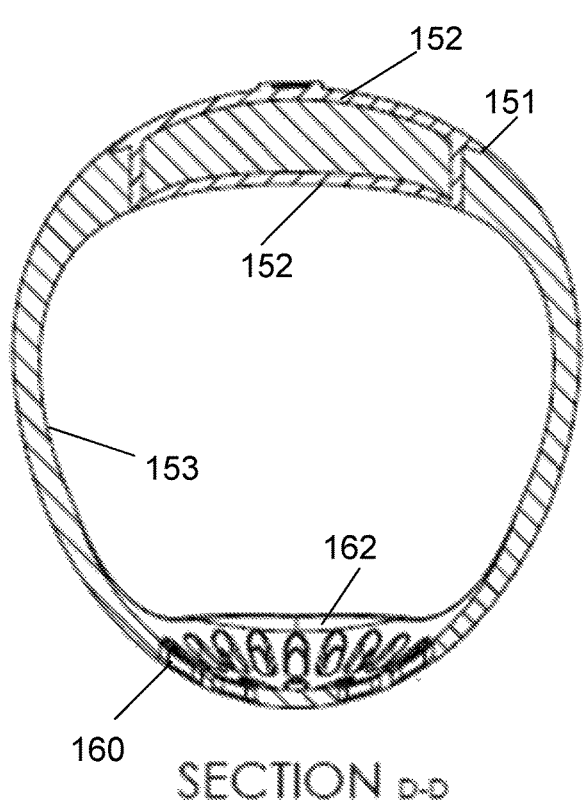
FIG. 5A illustrates a front view of a masher at the planar cross section D-D shown in FIG. 4A, according to an exemplary embodiment of the present subject disclosure.

FIG. 4A also shows a cross-sectional view of the masher 150 along plane D-D, which is shown in FIG. 5A. In FIG. 5A, the hand contact surfaces 152 are shown as covering a small thickness on the underlying handle 151. Alternatively, they can span through the entire thickness of the handle portion 151. The hand contact surfaces 152 can be at the top surface and or/the bottom surface without spanning throughout the handle 151 and do not have to span the entire width or thickness of the handle 151. During manufacture, the hand contact surfaces 152 may be later inserted into an aperture in the handle, such as in an overmolding process, as shown more clearly in perspective view of FIG. 5B, or can be later injected or inserted in an open portion of handle 151. Other options are also possible and within the purview of one having skill in the art after consideration of the present subject disclosure.

Figure 4B:
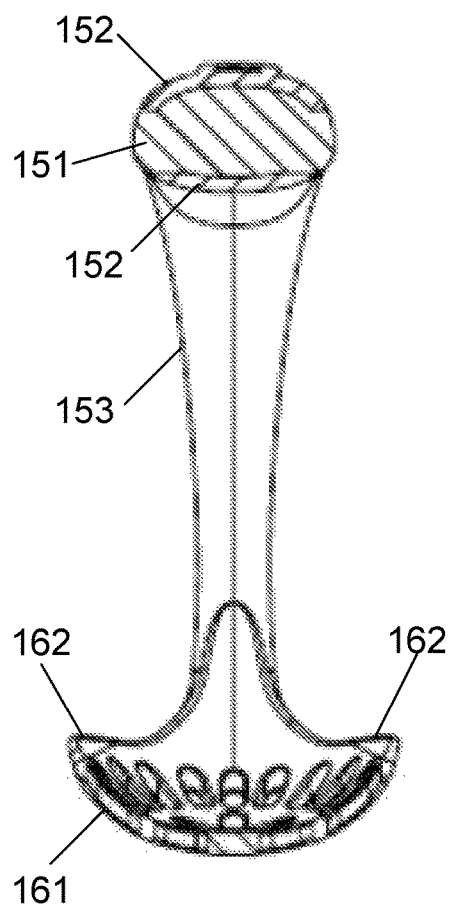
FIG. 4B illustrates a side view of a masher at the planar cross section C-C shown in FIG. 3B, according to an exemplary embodiment of the present subject disclosure.

FIG. 4B shows a cross sectional planar cut through plane C-C of FIG. 3B. The hand contact surfaces 152 and flexible outer edge portions 162 are shown for clarity.

Figure 5B:
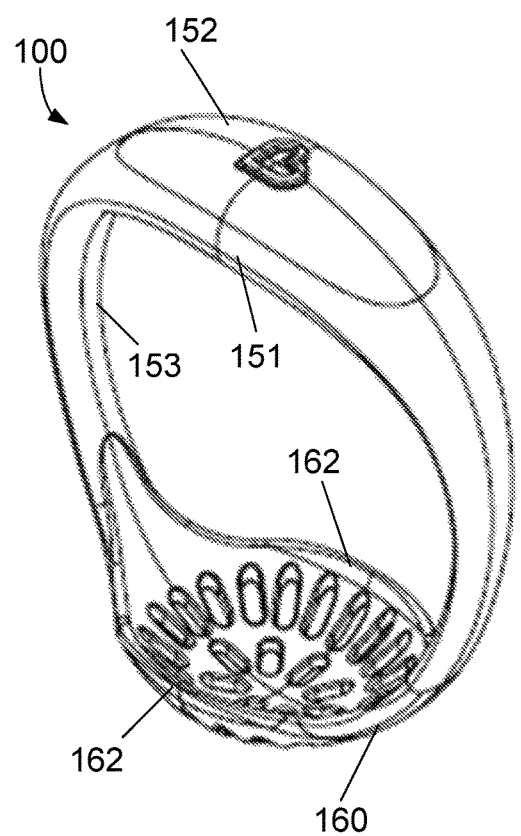
FIG. 5B illustrates a perspective view of a masher, according to an exemplary embodiment of the present subject disclosure.

FIG. 5B illustrates a perspective view of the masher 150. As shown, most of the masher 150 may be composed of a first material, for example, a hardened and durable plastic which is safe for humans, and can withstand dishwashing and microwave heating. The hand contact surfaces 152 and flexible outer edges 162 may be composed of a second material, which is a softer and more flexible material than the first material used for the rest of the masher 150. The entire masher 150 has a ring-like appearance and is ergonomically designed to be easily held in the handle 151 with the hand contact surface 152 being the substantial surface for contact with the hand or fingers holding on to the handle 151. The round, ring-like design allows for greater contact with the fingers thereby distributing the pressure of mashing across more surface areas, thereby decreasing the force required to mash food. This is especially helpful for elderly people or those who have hand dexterity issues.

The material used to compose the hand contact surfaces 152, flexible edges 162, and lid 130 can be a more flexible polymer, such as silicone. Other material which may have similar properties can also be used. In general, any material that has a soft textured surface (for comfortable handling in the hand contact surfaces 152), flexibility (for stretching the lid 130 over the bowl 110, and the flexible edges 162 to scrape the inside of the bowl 110, and for retaining the bowl 110 inside the suction cup 133), and higher surface friction (to maintain the lid 130 on a surface, and secure the lid 130 to the bowl 110) would be ideal to use. The hand contact surfaces 152, flexible edges 162, and lid 130 may also be composed of varying materials having similar properties. For example, the hand contact 152 may be composed of a softer material than that of the flexible edges 162.

Figure 6:
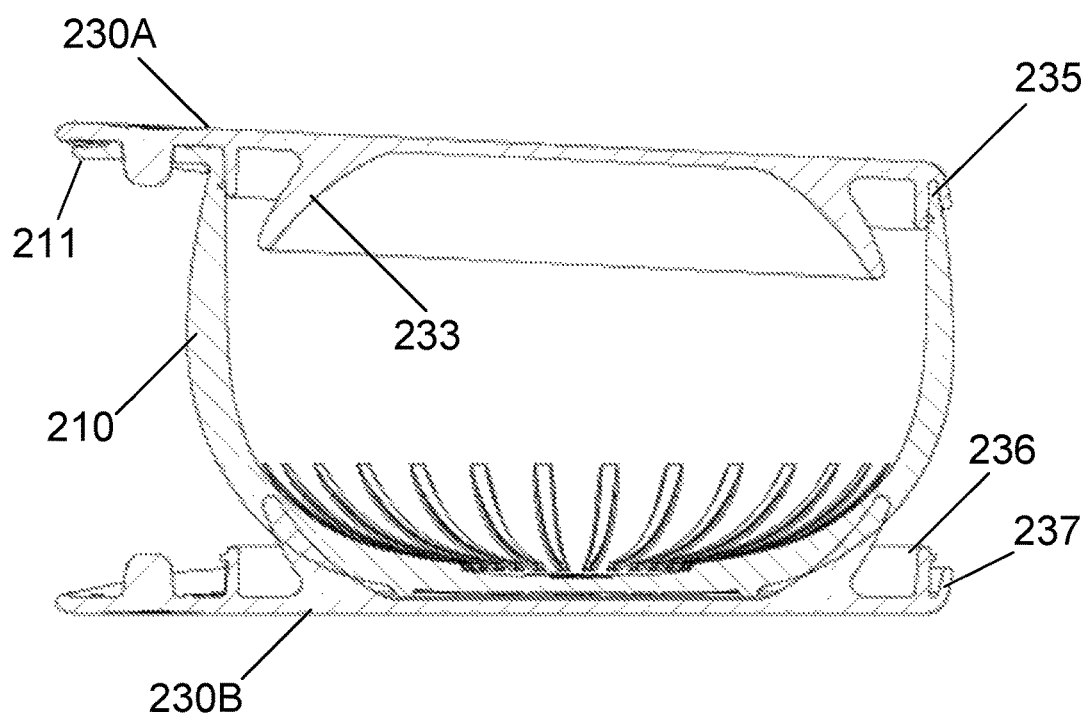
FIG. 6 shows an alternative embodiment of the bowl and lid configuration, according to an exemplary embodiment of the present subject disclosure.

FIG. 6 shows an alternative embodiment of the bowl assembly having a bowl 210 with lid 230 in alternative positions 230A and 230B, similar to what was described above with respect to FIG. 1D. This embodiment includes more pronounced ridges created by a pair of perpendicular peripheral walls 236 and 237 which mate with the outer peripheral rim 235 of the lid 230. The upper peripheral rim 235 of the bowl 210 can be fit securely within the valley formed between the pair of walls 236 and 237. A larger suction cup 233 is also shown which spans a wider portion of the lid 230. The bowl 210 may be constructed so that when it lays flat on a surface, it naturally tilts slightly downward from the tab portion 211 to the opposite side of the bowl 210. This allows a more ergonomic handling of the bowl 230 at the tab portion 211 during a mashing process.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A container assembly comprising:
   a bowl having an open top and a closed bottom; and
   a lid adapted to fit onto the open top of the bowl; and having a substantially flat top surface and a bottom surface with an embedded suction cup;
   a masher having a handle and a food compressing surface with a plurality of apertures, the masher being fully houseable inside the bowl when the lid is secured thereon;
   wherein the bottom of the bowl is adapted to be reversibly sealed onto the suction cup when the top side of the lid is placed inverted on a surface.

2. The container assembly of claim 1, wherein the food compressing surface has a central portion comprised of a first material and an edge comprised of second material which is more pliable than the first material.

3. The container assembly of claim 1, wherein the handle has a central portion comprised of a first material and a hand contact surface comprised of second material which is more pliable than the first material.

4. The container assembly of claim 3, wherein the handle has a plurality of hand contact surfaces, each of which is comprised of the second material.

5. The container assembly of claim 1, wherein the handle has a ring shape with flattened portions for the handle and the food compressing surface.

6. The container assembly of claim 1, wherein the compressing surface is arcuate.

7. The container assembly of claim 1, wherein the compressing surface has a greater width than the handle.

8. The container assembly of claim 1, further comprising a tab extending from the lid.

9. The container assembly of claim 8, further comprising a tab extending from the bowl and corresponding in position with the tab extending from the lid.

10. The container assembly of claim 9, further comprising a securing projection on the tab extending from the lid that is adapted to be received in an aperture in the tab extending from the bowl.

11. The container assembly of claim 1, further comprising internal ridges on an internal surface of the bowl.

12. The container assembly of claim 11, wherein the internal ridges are positioned annularly around the internal surface of the bowl.

13. A container assembly comprising:
    a bowl having an open top and a closed bottom; and
    a lid adapted to fit onto the open top of the bowl, and having a bottom surface with an embedded suction cup;
    a ring shaped masher having a flattened portion for a handle and a flattened portion for a food compressing surface, the masher being fully houseable inside the bowl when the lid is secured on the top of the bowl;
    wherein the bottom of the bowl is adapted to be reversibly sealed onto the suction cup.

14. The container assembly of claim 13, wherein the food compressing surface has a central portion comprised of a first material and an edge comprised of second material which is more pliable than the first material.

15. The container assembly of claim 13, wherein the compressing surface is arcuate.

16. The container assembly of claim 13, further comprising internal ridges on an internal surface of the bowl.

17. A container assembly comprising:
    a bowl having an open top and a closed bottom, with internal ridges on an internal surface; and
    a lid adapted to fit onto the open top of the bowl, and having a bottom surface with an embedded suction cup;
    a ring-shaped masher having a handle and a food compressing surface, which has a central portion comprised of a first material and an edge comprised of second material which is more pliable than the first material, the masher being fully houseable inside the bowl when the lid is secured on the top of the bowl;

wherein the bottom of the bowl is adapted to be reversibly sealed onto the suction cup when the top side of the lid is placed inverted on a surface.

\* \* \* \* \*